United States Patent
Cai et al.

(10) Patent No.: US 12,451,569 B2
(45) Date of Patent: Oct. 21, 2025

(54) DEVICE FOR IMPACT WELDING OF BATTERY TERMINALS

(71) Applicant: GM Global Technology Operations LLC, Detroit, MI (US)

(72) Inventors: Wayne Cai, Troy, MI (US); Teresa Jean Rinker, Royal Oak, MI (US); Jennifer Therese Bracey, Holly, MI (US); Shunyi Zhang, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 882 days.

(21) Appl. No.: 17/587,126

(22) Filed: Jan. 28, 2022

(65) Prior Publication Data

US 2023/0246315 A1    Aug. 3, 2023

(51) Int. Cl.
*H01M 50/566* (2021.01)
*B23K 11/00* (2006.01)
*B23K 101/36* (2006.01)

(52) U.S. Cl.
CPC ....... *H01M 50/566* (2021.01); *B23K 11/0026* (2013.01); *B23K 2101/36* (2018.08)

(58) Field of Classification Search
CPC ........... H01M 50/566; H01M 10/0404; H01M 50/533; H01M 50/536; H01M 50/538; H01M 10/0525; H01M 10/058; B23K 11/0026; B23K 2101/36; B23K 2101/38; B23K 20/06; B23K 20/26; Y02E 60/10

See application file for complete search history.

(56) References Cited

U.S. PATENT DOCUMENTS

| | | |
|---|---|---|
| 12,084,115 B2 | 9/2024 | Otsuka |
| 2013/0086961 A1 | 4/2013 | Yablochnikov et al. |
| 2018/0050496 A1 | 2/2018 | Racineux et al. |
| 2023/0241705 A1 | 8/2023 | Cai et al. |

FOREIGN PATENT DOCUMENTS

| | | |
|---|---|---|
| CN | 1416599 A | 5/2003 |
| CN | 201562697 U | 8/2010 |
| CN | 105609694 A | 5/2016 |
| CN | 112975105 A | 6/2021 |
| CN | 113020773 A | 6/2021 |
| CN | 113422166 A | 9/2021 |
| KR | 101180910 B1 | 9/2012 |

OTHER PUBLICATIONS

German Office Action for German Application No. 102022126390.8; dated Apr. 17, 2025; 11 pages.
German Office Action for German Application No. 102022126393.2; dated Apr. 17, 2025; 8 pages.
Chinese Office Action for Chinese Application No. 202211286035.7; dated Aug. 19, 2025; 7 pages.

*Primary Examiner* — Robert G Bachner
(74) *Attorney, Agent, or Firm* — CANTOR COLBURN LLP (57) ABSTRACT

Disclosed herein is a device for magnetic welding of battery boils comprising a coil holder; where the coil holder comprises one or more electrical coils that are operative to be activated by an electrical current; a foil holding fixture; wherein the foil holding fixture comprises a plurality of arms; wherein each pair of adjacent arms is operative to move towards one another to crimp a plurality of battery foils; and an anvil; wherein the anvil is operative to support a battery tab and the battery foils.

14 Claims, 7 Drawing Sheets

DEVICE FOR IMPACT WELDING OF BATTERY TERMINALS

INTRODUCTION

Disclosed herein is a device for impact welding of battery terminals. More specifically, disclosed herein is a device for welding dissimilar metals to reduce defects and to be more tolerant to surface oxides/contaminants.

Lithium ion battery packs for vehicle and other high-power applications may include multiple lithium ion battery cells that are electrically connected together. Each cell includes a plurality of lithium ion electrode pairs that are enclosed within a sealed pouch envelope. Each electrode pair includes a negative electrode, a positive electrode, and a separator that physically separates and electrically isolates the negative and positive electrodes. To facilitate lithium ion mobility, an electrolyte that conducts lithium ions may be present within the separator. The electrolyte allows lithium ions to pass through the separator between the positive and negative electrodes to counterbalance the flow of electrons that, during charge and discharge cycles of the lithium ion battery cell, circumvent the separator and move between the electrodes through an external circuit. Depending on their chemistry, each lithium ion battery cell has a maximum or charging voltage (voltage at full charge) due to the difference in electrochemical potentials of the electrodes. For example, each lithium ion battery cell may have a charging voltage in the range of 3V to 5V and a nominal open circuit voltage in the range of 3.5V to 4V. Lithium ion battery cells may be connected in series, in parallel, or in series and in parallel depending on the specified battery pack design.

The plurality of electrode pairs are electrically connected in parallel to electrochemically store and release electric power. Each electrode pair includes an anode and a cathode with a separator disposed in between. Each anode has an anode current collector with a negative foil, and each cathode has a cathode current collector with a positive foil. The negative foils of the anodes of the plurality of electrode pairs are electrically connected in parallel and electrically connected to a negative terminal tab that protrudes through the pouch, and the positive foils of the cathodes of the plurality of electrode pairs are electrically connected in parallel, and electrically connected to a positive terminal tab that protrudes through the pouch.

Within each battery cell, the negative terminal tab electrically communicates with the negative current collectors that contact and exchange electrons with the negative electrodes of the electrode pairs, and the positive terminal tab electrically communicates with the positive current collectors that contact and exchange electrons with the positive electrodes of the electrode pairs. Lithium ion battery cells are capable of being discharged and re-charged over many cycles.

The negative foils of the anodes of the plurality of electrode pairs may be electrically connected in parallel and electrically connected to the negative terminal tab using laser welding. Likewise, the positive foils of the anodes of the plurality of electrode pairs may be electrically connected in parallel and electrically connected to the positive terminal tab using laser welding.

Laser welding is a metal joining process in which a laser beam is directed at a stack of metal workpieces to provide a concentrated energy source capable of generating a fusion weld joint between the overlapping constituent metal workpieces. Layers of metal workpieces may be stacked and aligned relative to one another such that their faying surfaces overlap to establish a faying interface (or faying interfaces) within an intended weld site. A laser beam is then directed at or near a top surface of the workpiece stack. The heat generated from the absorption of energy that is supplied by the laser beam initiates melting of the metal workpieces and establishes a molten weld pool within the workpiece stack. The molten weld pool penetrates through the metal workpiece impinged upon by the laser beam and into the underlying metal workpiece or workpieces to a depth that intersects with all of the established faying interfaces. The laser beam rapidly generates a molten weld pool upon impinging the top surface of the workpiece stack. This molten weld pool solidifies to form a weld joint that is composed of re-solidified materials from all the layers of the metal workpieces. Such fusion of the material from the overlapping layers of the metal workpieces forms a weld joint.

Porosities and/or cracks are known to form along a laser weld fusion line of the foils due to the moistures absorbed by the oxides on foil surfaces and tab surfaces. Ultrasonic pre-welding of foils serves to consolidate the foils, and remove some or all of the absorbed moistures and some oxides. Subsequently, laser welding of tab/foils aimed at the pre-welded locations will result in welds with reduced porosities/cracks. Localized material voids, which may be manifested as gaps between layers in the workpiece stack and/or as voids in one or more of the workpieces may affect service life of the weld joint, and hence affect service life of the component that includes the weld joint. When the workpiece stack includes a plurality of foils that are welded to a battery tab, the occurrence of localized material voids may compromise the strength of the weld joint and affect electrical conductivity between one or more of the foils and the battery tab.

It is therefore desirable to develop new methods for bonding battery foils to a tab or for bonding the foils together.

SUMMARY

Disclosed herein is a device for magnetic welding of battery boils comprising a coil holder; where the coil holder comprises one or more electrical coils that are operative to be activated by an electrical current; a foil holding fixture; wherein the foil holding fixture comprises a plurality of arms; wherein each pair of adjacent arms is operative to move towards one another to crimp a plurality of battery foils; and an anvil; wherein the anvil is operative to support a battery tab and the battery foils.

In an embodiment, each pair of adjacent arms move symmetrically about a vertical axis through a coil.

In another embodiment, each pair of adjacent arms are located symmetrically about the one or more electrical coils.

In yet another embodiment, the coil holder further comprises a plurality of sets of electrical coils; where each set of electrical coils is located at a different height from a surface of the coil holder.

In yet another embodiment, each electrical coil of the one or more electrical coils is activated by an electrical current of a different strength.

In yet another embodiment, each set of electrical coils is activated by an electrical current of a different strength.

In yet another embodiment, the coil holder comprises an electrically insulating material.

In yet another embodiment, the electrically insulating material comprises an organic polymer, a ceramic or a combination thereof.

In yet another embodiment, the plurality of arms are transported along guide rails; where the arms have grooves at a rear end that mesh with the guide rails.

In yet another embodiment, the coil holder is in communication with a source of electrical energy.

In yet another embodiment, the plurality of arms comprise an electrically insulating material.

In yet another embodiment, each set of electrical coils activates bonding in a different region of the electrical foils.

In yet another embodiment, different sets of electrical coils may be activated simultaneously.

In yet another embodiment, different sets of electrical coils may be activated sequentially.

Disclosed herein is a method comprising placing a plurality of electrical foils of a battery in a foil holding fixture; crimping the plurality of electrical foils by moving at least one pair of adjacent arms of the foil holding fixture; energizing at least one electrical coil disposed over a crimped portion of the plurality of electrical foils; and bonding the electrical foils to one another.

In an embodiment, the plurality of electrical foils are supported on an anvil.

In another embodiment, a tab of the battery is placed below the electrical foils.

In yet another embodiment, the tab of the battery has a knurled surface and wherein the knurled surface faces the electrical foils.

In yet another embodiment, the least one pair of adjacent arms move symmetrically about a vertical axis through the at least one electrical coil.

In yet another embodiment, different electrical foils of the plurality of electrical foils are sequentially energized to bond different sections of the foil.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features.

Disclosed herein is a device and a method of performing magnetic pulse welding (hereinafter magnetic welding) to bond together the metal foils of a battery and/or to bond the metal foils to the battery tab. In an embodiment, the battery can be a lithium ion battery. The device advantageously comprises a coil holder which holds a plurality of coils that generate a magnetic field and a battery foil holding fixture upon which a metal tab with a knurled surface is disposed and upon which the foils are disposed during the welding process. In an embodiment, the battery foil holding fixture comprises a plurality of movable arms which can move back and forth from each other to create a gap between the foils which permits the foils to contact each other at speeds of 400 to 900 meters per second and to bond to each other.

Prior to describing the device and the method for magnetic welding the foils of a battery, a brief introduction to the relevant parts of a battery is presented in order to enhance an understanding of this disclosure.

Figure 1:
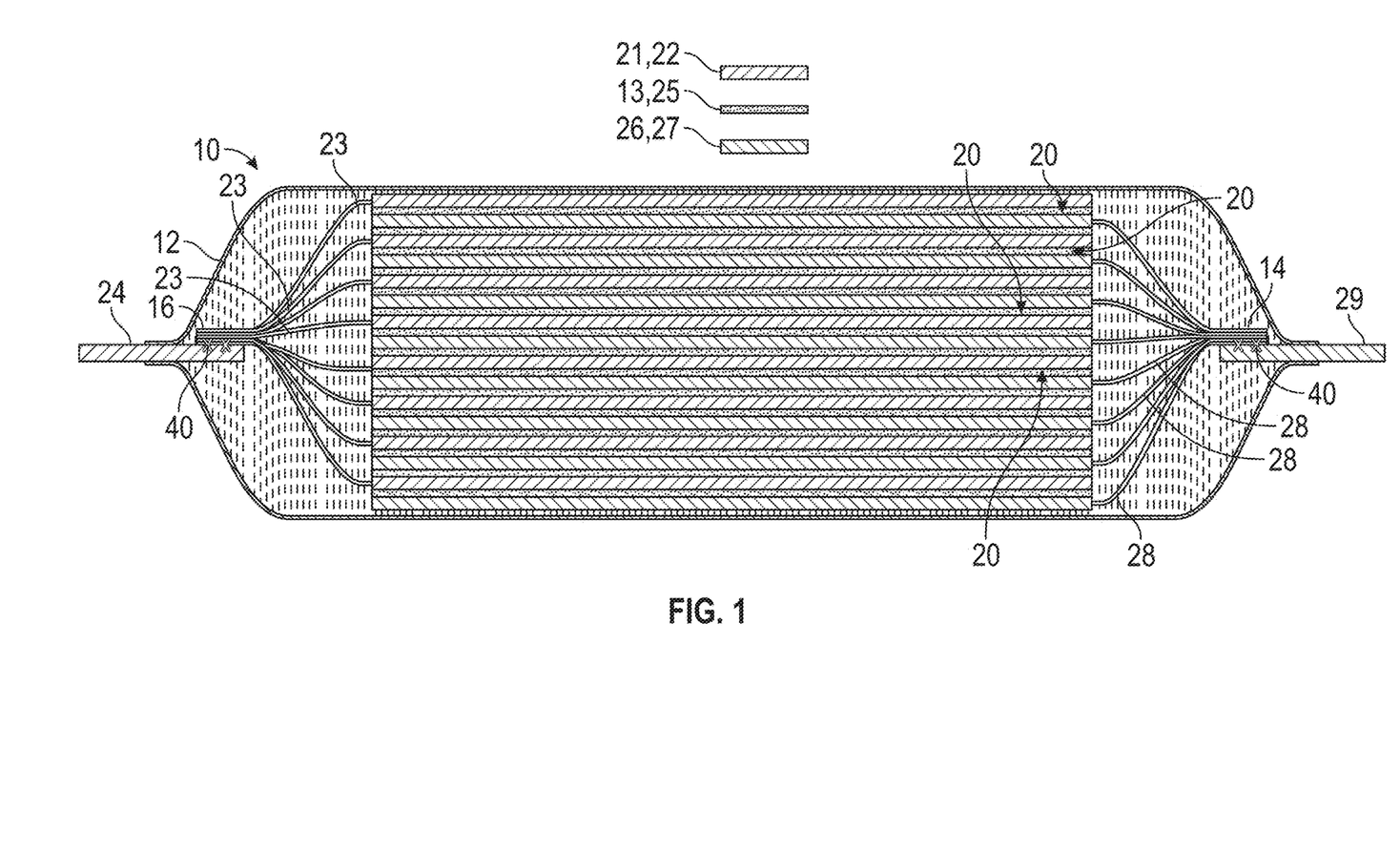
FIG. 1 is an exemplary depiction of a battery.

Referring to the drawings, wherein like reference numerals correspond to like or similar components throughout the several Figures, FIG. 1 schematically illustrates an embodiment of a prismatically-shaped lithium ion battery cell 10 that includes a plurality of electrode pairs 20 that are arranged in a stack and sealed in a flexible pouch 12 containing an electrolytic material 13. A first, positive battery cell tab 29 and a second, negative battery cell tab 24 protrude from the flexible pouch 12. Each of the electrode pairs 20 includes an anode 21 arranged on an anode (or negative) current collector 22, and a cathode 26 arranged on a cathode (or positive) current collector 27, and are separated by a separator 25. The cathode current collector 27 is fabricated from aluminum or an aluminum alloy and includes a positive foil (or cathode foil) 28. The anode current collector 22 is fabricated from copper, a copper alloy, or another material, and includes a negative foil (or anode foil) 23.

The negative and positive current collectors 22, 27 are thin metallic plates that contact their respective negative and positive electrodes 21, 26 over an appreciable interfacial surface area. The purpose of these metal current collectors 22, 27 is to exchange free electrons with their respective negative and positive electrodes 21, 26 during discharging and charging of the electrode pairs 20. To facilitate the collective distribution and flow of electrons, each of the negative current collectors 22 includes the negative foil 23, and each of the positive current collectors 27 includes the positive foil 28.

The plurality of negative foils 23 protrude away from the electrode pairs 20 and are positioned in overlapping alignment with one another, and the plurality of positive foils 28 also protrude away from the electrode pairs 20 and are positioned in an overlapping alignment with one another. The aligned sets of negative and positive foils 23, 28 are separated from each other either on different sides of the electrode pairs 20 (as shown), or are on the same side of the electrode pairs 20 (not shown). The plurality of positive foils 28 of the cathode current collectors 27 are arranged in a first stack 14, and are electrically coupled and mechanically joined to the positive battery cell tab 29 in a manner that is described herein. The plurality of negative foils 23 of the anode current collectors 22 are arranged in a second stack 16, and are electrically coupled and mechanically joined to the second, negative battery cell tab 24.

Each of the electrode pairs 20 includes a positive electrode (or cathode) 26, a negative electrode (or anode) 21, and a separator 25 disposed between the positive and negative electrodes 26, 21 to physically separate and electrically insulate the positive and negative electrodes 26, 21 from each other. The electrolytic material 13 that conducts lithium ions is contained within the separator 25 and is exposed to each of the positive and negative electrodes 26, 21 to permit lithium ions to move between the positive and negative electrodes 26, 21.

The device and the method disclosed herein is used to bond together the plurality of positive foils 28 to form the first stack 14 and the plurality of negative foils 23 to form the second stack 16. The use of magnetic welding has some significant advantages over other known methods—notably that it can be used to bond dissimilar metals, be used to bond metals with oxide coatings and contaminants without any adverse effects to the battery.

Magnetic Pulse Welding (MPW) uses electromagnetically generated forces to create a solid-state cold weld at room temperature. This weld is completed in microseconds and is stronger than the base metals joined. No heat, filler materials or gases are used. The conductive workpiece (also called a flyer workpiece because it is displaced by the activating electric current) is placed inside or next to an electrical coil which accelerates it over a distance to impact the second workpiece (which is a stationary workpiece) at extremely high speed. A large amount of energy in the form of an electrical current is discharged in an extremely short period of time through the coil. Some systems can discharge up to 2 million amps in less than or equal to 100 microseconds. The acceleration is a result of repelling magnetic fields (pressure) between the workpiece and the coil, produced by an incident current in the coil (resulting in eddy currents in the workpiece). This magnetic pressure forces the conductive flyer workpiece towards the secondary stationary workpiece at high velocity to cause welding. The impacting speed is more than 1000 kilometers per hour (km/h).

A solid state cold weld is created when two metals are forced together in such intensity that their atoms start sharing electrons, practically fusing the two metals together. The actual process lasts no longer than 100 microseconds. Since there is no heat or melting involved, dissimilar metals can be welded using this technique. MPW triggers this phenomenon by accelerating the metal into a visco-plastic phase and impacts the other workpiece at an exact speed and angle. No protecting atmosphere, filler materials or other aiding materials are used in this bonding process. The magnetic pulse welding process is a "cold" welding process; the material does not get warmer than 30° C. Due of this, no heat affected zone is created, and the metal is not degraded. The weld becomes the strongest part of the assembly.

Other advantages of magnetic pulse welding are that it can be used to bond features in designs that were previously not possible. It is a high speed process—a typical pulse lasts from 10 to 100 micro-seconds (μs), so the only time limitation is loading and unloading. It is highly repeatable, reproducible, and reliable and therefore well suited to high-volume production. Many welding combinations using dissimilar metals are possible. It is a cold weld with no heat-affected zone. It is a green process that does not produce any heat, sparks, smoke or radiation. It is also a clean process with no pre- or post-welding. The bond between the different metals is of a high quality, very aesthetic and produces a cleaner interface. The bond maintains a mechanical strength (typical joints are stronger than the parent material). The bond is a high precision bond with no distortion. There generally is no formation of corrosion in the welding area. All of these advantages translate into significantly lower costs and much higher quality and productivity.

Figures 2A, 2B:
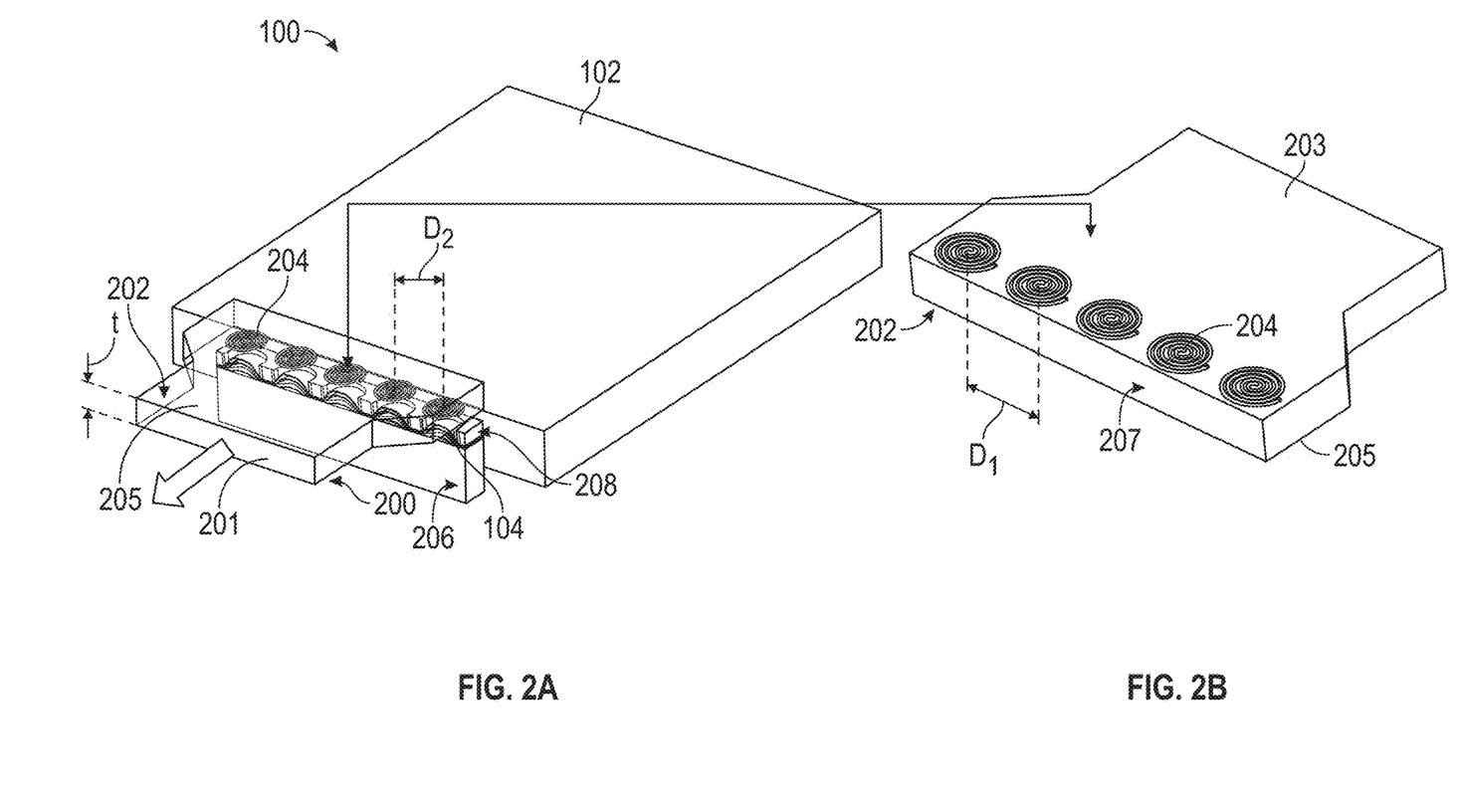
FIG. 2A is an exemplary depiction of battery along with the device to facilitate magnetic welding.
FIG. 2B depicts an expanded view of a coil holder in an upside-down position.

FIG. 2A depicts a device 200 that is used to weld the foils 104 of a battery 100. The battery 100 comprises a pouch 102 from which protrudes foils 104. The structure of the battery 100 and its foils 104 are already detailed above in the FIG. 1 and will not be detailed again.

The device 200 comprises a coil holder 202, a foil holding fixture 208 and an anvil 206 upon which the foils 104 are disposed during the magnetic welding. The coil holder 200 shown in the FIGS. 2A and 2B comprises an electrically insulating material that contains the electrical coils 204. The electrical coils 204 may be disposed at any location in the thickness "t" of the coil holder 202 but are preferably located at a surface closest to the battery foils. In an embodiment, the electrical coils 204 are located proximate to the lower surface 203 of the coil holder 202 and proximate to a front end of the coil holder 202. The front end of the coil holder 202 is the end closest to the foils 104 when the device 200 is used to weld the foils. The rear end 201 opposite to the front end of the coil holder 202 may be connected to a power supply which supplies electrical energy to the plurality of electrical coils 204. In an embodiment, the rear end 201 contains contacts (not shown) for connecting the coil holder 202 to a capacitor bank (not shown).

Suitable electrically insulating materials for use in the coil holder 202 include thermoplastic organic polymers, thermosetting organic polymers, or a combination thereof. Suitable organic polymers include polyolefins, polystyrenes, poly(meth)acrylates, polyesters, polyimides, polyether ether ketones, polysiloxanes, polyfluoroethylenes, or a combination thereof.

Another category of suitable electrically insulating materials includes ceramics. Examples of ceramics include silica, alumina, titania, zirconia, ceria, or a combination thereof. Combinations of ceramics with organic polymers may also be used.

FIG. 2B depicts an expanded view of the coil holder 202 in an upside-down position. The lower surface 203 of the coil holder 202 contains a plurality of electrical coils 204 while the upper surface 205 does not contain any coils. The number of electrical coils is directly proportional to the number of crimping spaces in the foil holding fixture 208. The crimping space is the region between the arms of the foil holding fixture 208 and this will be described later. In an embodiment, the arms of the foil holding fixture 208 move symmetrically about a vertical axis through a coil.

The spacing "$D_1$" between the electrical coils is also directly proportional to the spacing "$D_2$" between the crimping spaces in the foil holding fixture. The coil holder 202 may contain 2 or more coils, preferably 4 or more coils and preferably 5 or more coils.

Figure 3:
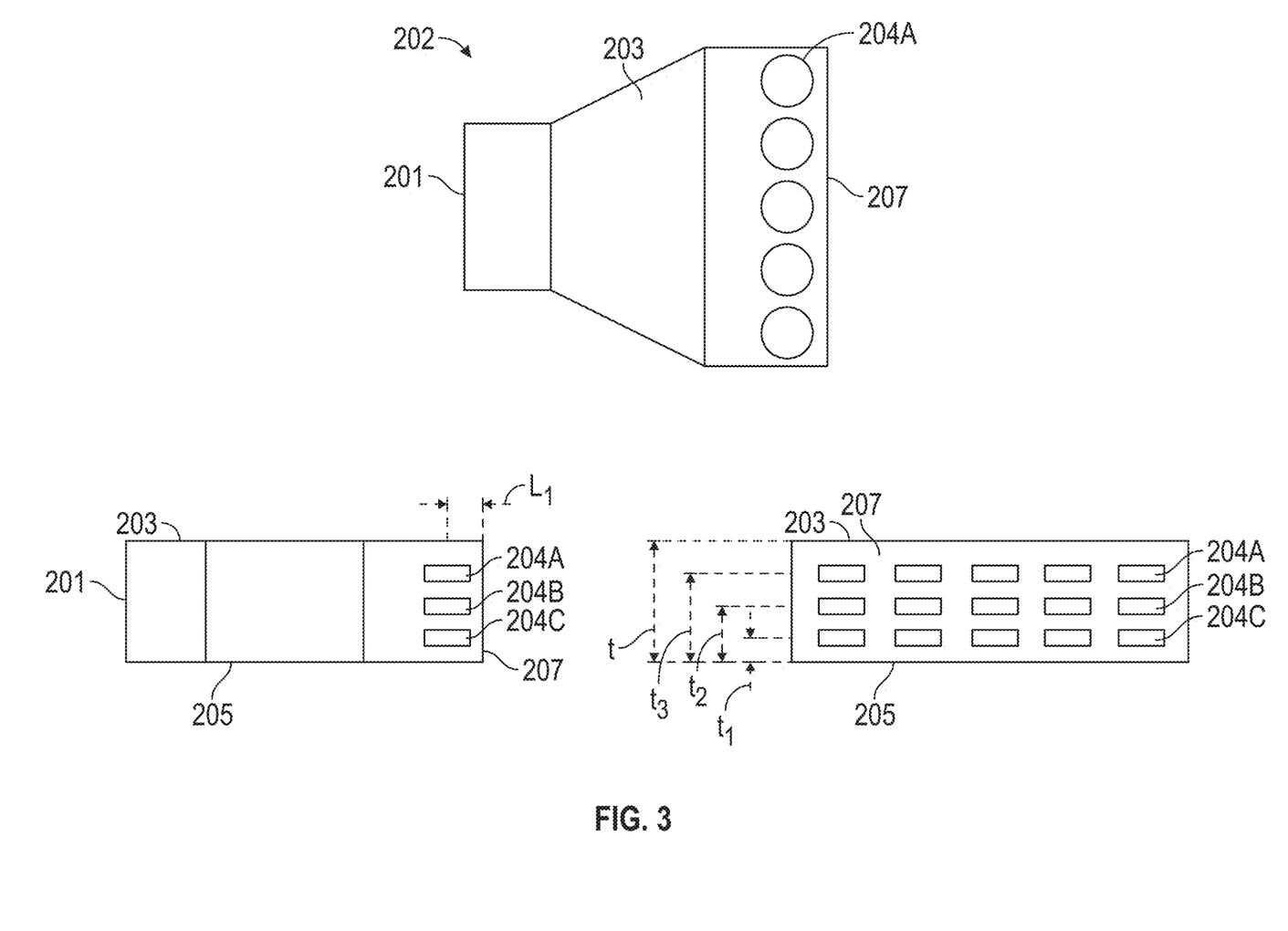
FIG. 3 is an exemplary depiction of a coil holder that holds a plurality of different coil sets.

In an embodiment depicted in the FIG. 3, the coil holder 202 may contain a plurality of electrical coils 204A, 204B and 204C where each plurality of coils is located at a different distance (of $t_1$, $t_2$ and $t_3$ respectively) from the lower surface 205 of the coil holder 202. The coil holder has a thickness "t" enclosed between the upper surface 203 and the lower surface 205 of the coil holder.

The different distances (of $t_1$, $t_2$ and $t_3$ respectively) permit the battery foils (not shown) to be subjected to an electrical field (and hence a magnetic field) of a different strength or configuration (depending upon the coil set 204A, 204B or 204C used) so as to improve the bond between the battery foils. FIG. 3 depicts a front view, top view and side view of a coil holder 202 that contains a plurality of coil sets 204A, 204B and 204C located at distances of $t_1$, $t_2$ and $t_3$ respectively from the lower surface 205 of the coil holder 202. The front end 207 of the coil holder is located close to the battery pouch and the foils (not shown) during the welding operation while the rear end 201 of the coil holder contacts a capacitor bank (not shown). Each coil set 204A, 204B and 204C is located at a distance Li from the front end 207. It is also plausible for each coil set to be located 204A, 204B or 204C to be located at a different distance (not shown) from the front end 207. The different distances from the front end may also be used to subject the battery foils to an electrical field (and hence a magnetic field) of a different strength or configuration. In another embodiment (not shown), each coil set may be located at a different height from a surface of the coil holder 202.

While the FIG. 3 depicts the coil holder 202 as having 3 coil sets (a first set 204A, a second set 204B and a third set 204C), it is indeed plausible for the coil holder to contain less than 3 coil sets or alternatively, to contain more than 3 coil sets. A switch (not shown) may be used to direct energy to any one of the coil sets, or alternatively, to direct energy to any combination of coil sets. In another embodiment, the switch may be used to direct energy to any combination of coils in the coil sets.

It is to be noted that different amounts of electrical energy may be supplied to the coils. Alternatively, the energy supplied to a single set of coils may be varied with time. By using different coils, different amounts of energy in each coil set, using different amounts of energy in a single coil over different periods of time or a combination thereof, the amounts of bonding energy and the location of the bonding energy may be varied thus improving the quality of the bond between the foils and the bond between the foils and the respective tabs.

Figure 4:
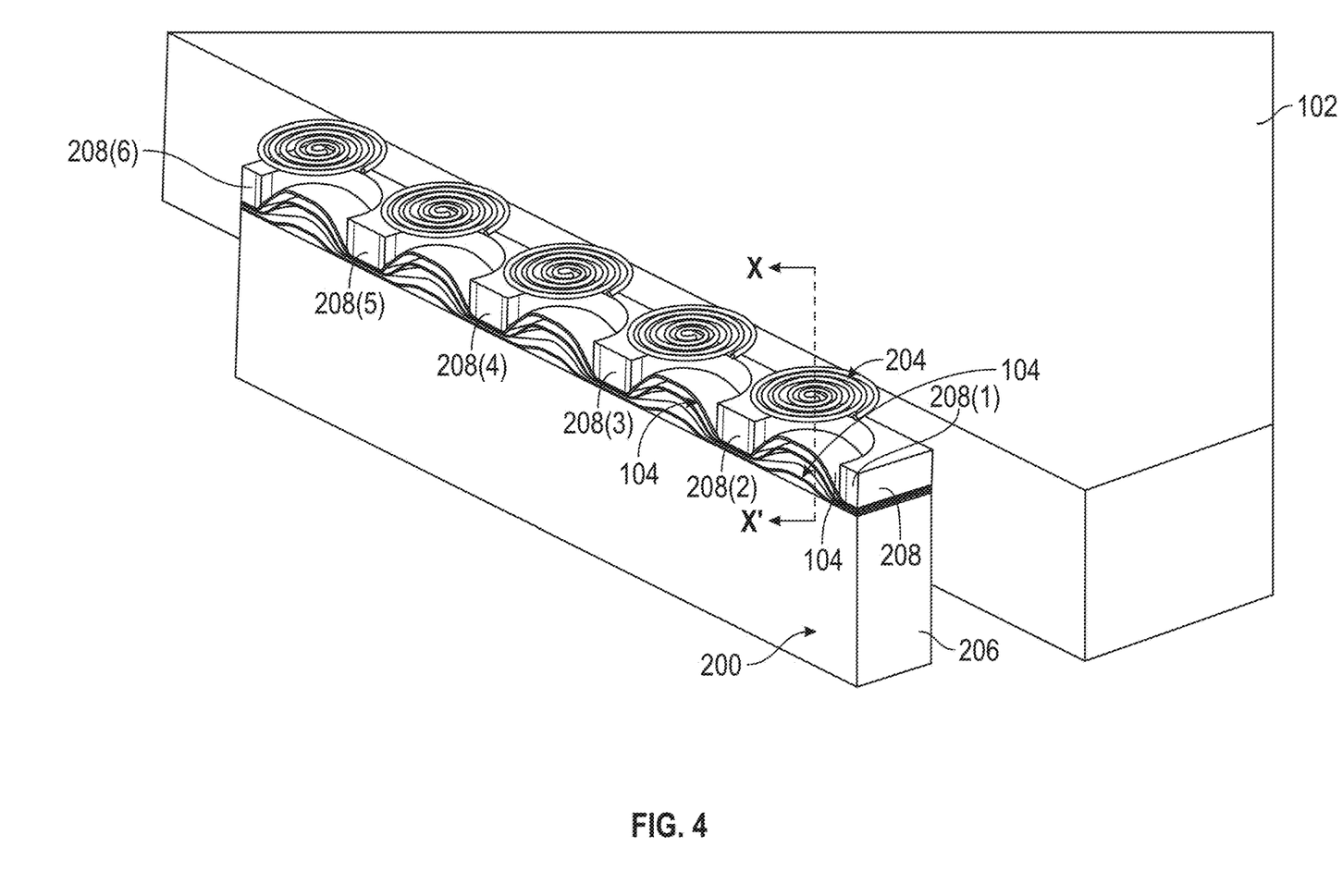
FIG. 4 is another exemplary depiction of the device to facilitate magnetic welding.
Figure 5A:
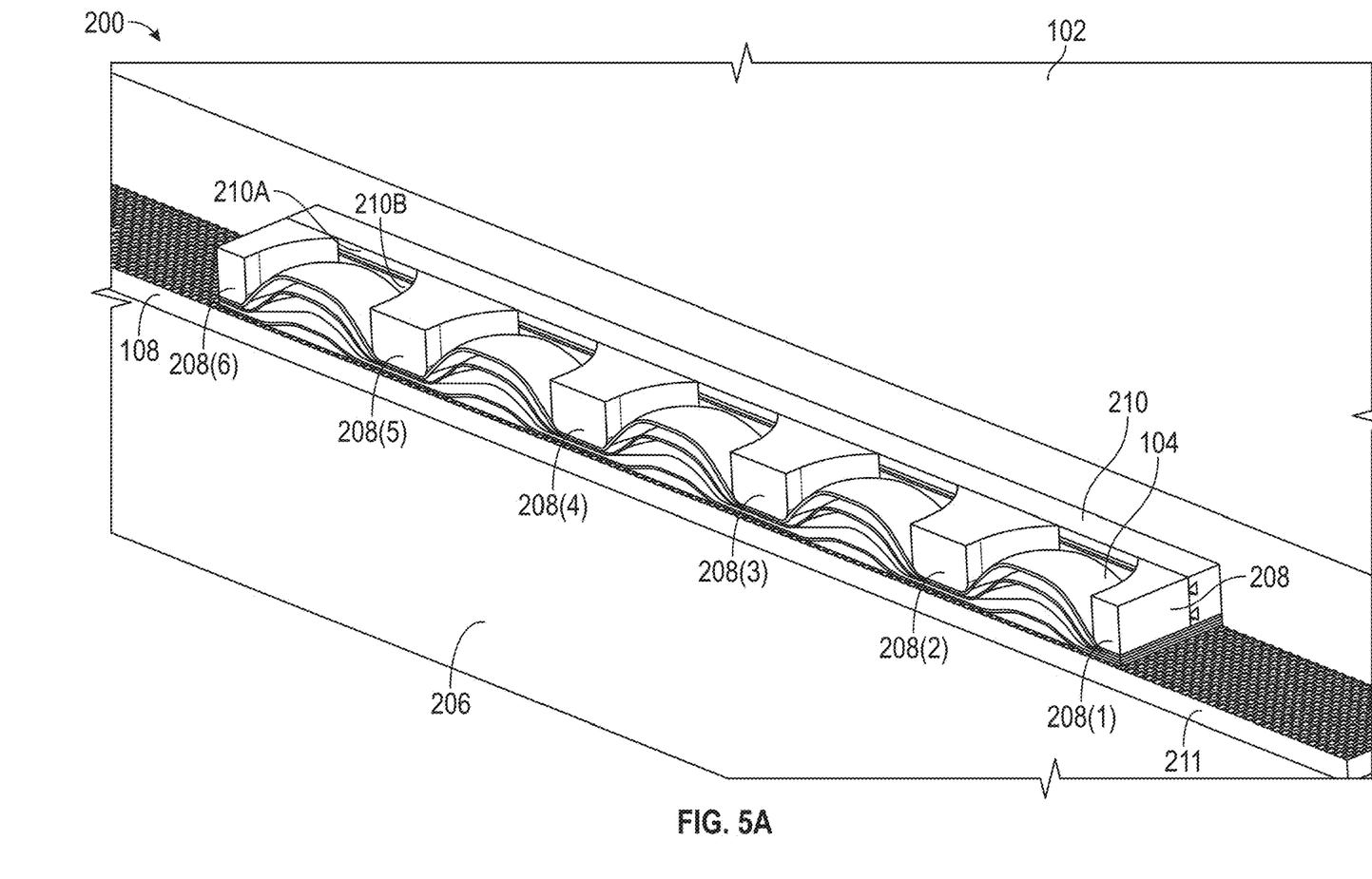
FIG. 5A is another exemplary depiction of the device to facilitate magnetic welding.

FIGS. 4, 5A, 5B and 5C depict exemplary embodiments of the device 200 without the coil holder 202. The FIG. 4 depicts a magnified view of the foil holding fixture 208 and an anvil 206 upon which the foils 104 are disposed during the magnetic welding. FIG. 4 depicts the plurality of coils 204 along with portions of the device 200. FIG. 5A is a further expanded view of the FIG. 4 and shows portions of the device 200 without the coil holder 202. The foil holding fixture 208 comprises a back rail 210 that supports a plurality of arms 208(1), 208(2), 208(3), 208(4), 208(5), 208(6), and so on. The arms can move towards and away from each other along the back rail 210. The back rail 210 comprises guide rails 210A and 210B along which the respective arms can travel to-and-fro with regard to each other to facilitate crimping of the foils 104. Each arm has grooves (e.g., dove tail grooves, splines, or the like) at their rear end that mesh with guide rails 210A and 210B and permit the arms to travel to-and-fro. The arms and the back rail are manufactured from an electrically insulating material (such as those detailed above).

Figure 5B:
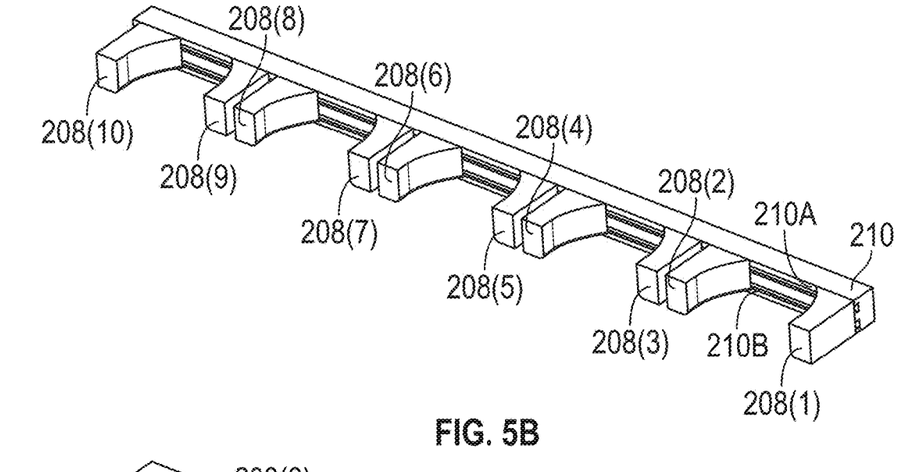
FIG. 5B is an exemplary depiction of the foil holding fixture with the arms spaced apart as far as possible.
Figure 5C:
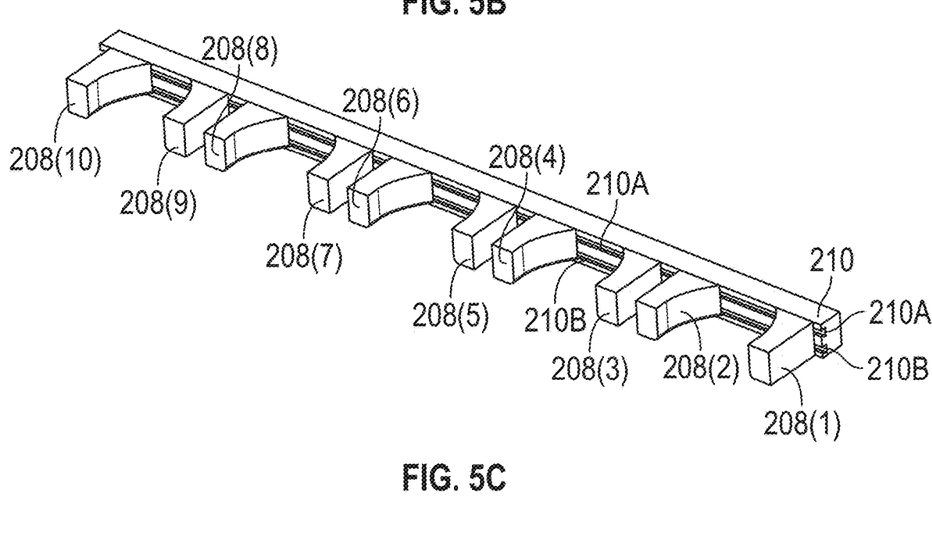
FIG. 5C is another exemplary depiction of the foil holding fixture with opposing arms spaced closer to each other than in the FIG. 5B.

FIGS. 5B and 5C are schematic depictions of an exemplary back rail 210 with a plurality of arms 208(1), 208(2), 208(3), 208(4), 208(5), 208(6), 208(7), 208(8), 208(9), 208(10), and so on. In an embodiment, the odd numbered arms 208(1), 208(3), 208(5) and 208(7) move synchronously in one direction while the even numbered arms 208(2), 208(4), 208(6) and 208(8) move synchronously in an opposing direction from the odd numbered arms. FIG. 5B shows the back rail with opposing pairs of arms (e.g., 208(1) and 208(2)) further apart than in the FIG. 5C, where they are closer together. The arms move symmetrically about a vertical axis XX' for each coil (See FIG. 4.). Each opposing pairs of arms move towards and away from each other along the guide rails 210A and 210B. In other words, for each coil in the coil holder 202, there is a pair of arms present on the foil holding fixture 208. These arms crimp the plurality of foils directly below each coil when an opposing pair of arms grip the foils and move towards each other.

This synchronous movement of the even and odd numbered arms permits each pair of adjacent arms to move towards each other to crimp the foils and then to move away from each other (thereby releasing the foils) after the welding operation has occurred. In an embodiment, the synchronous movement of the arms may be facilitated and controlled by a stepper motor (not shown) in communication with a microprocessor (not shown).

Figure 6:
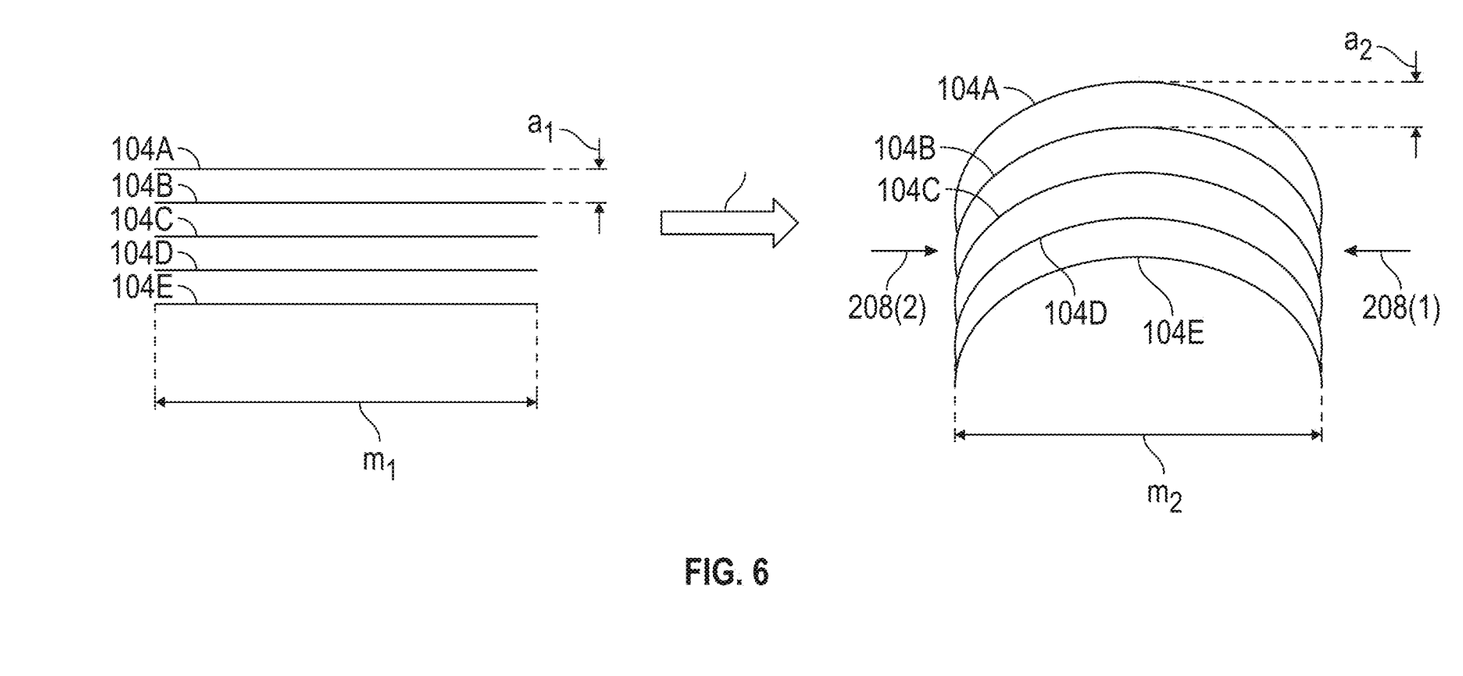
FIG. 6 is an exemplary depiction of foils before and after crimping.

The crimping of a plurality of foils is depicted in the FIG. 6. FIG. 6 depicts a plurality of foils 104A, 104B, 104C, 104D and 104E before and after crimping by arms 208(2) and 208(1) (indicated by arrows). The crimping occurs when the foils are pinned down by an adjacent pair of arms (of the foil holding fixture) that move towards each other. As the foils move towards each other, the radius of curvature of each of the foils is decreased and the average distance between adjacent foils is increased. The crimping reduces the length of the foils from $m_1$ to $m_2$ and decreases the radius of curvature of each of the foils (and hence the average distance between the foils) in order to facilitate movement of the foils to facilitate welding. The radius of curvature of the foils after crimping is less than the radius of curvature prior to crimping.

Prior to the crimping, the plurality of foils are separated by an average distance $a_1$. After crimping, the plurality of foils are separated by an average distance $a_2$ that is greater than $a_1$. The increase in average distance between the foils facilitates an increase in the velocity of the foils towards each other when subjected to opposing magnetic fields. The opposing magnetic fields force the workpieces towards each other at high velocity to promote the welding. The increase in the velocity promotes a greater impact between the foils which facilitates a stronger weld between the foils.

With reference now again to the FIGS. 4 and 5A, it may be seen that the plurality of foils 104 are situated on the anvil 206 during the magnetic welding operation. The anvil 206 is preferably manufactured from one of the electrically insulating materials detailed above. The anvil 206 supports the tab 108 (positive battery cell tab or negative battery cell tab) from the battery. As noted above, the tabs generally comprise copper or aluminum. In an embodiment, the surface of the tab 108 is knurled (or have surface texture/projections) to further enhance the welding quality (by introducing gaps) between the tab and the foils that are disposed on it. The knurling produces a surface roughness which increases gaps between the tab 108 and the closest foil (of the plurality of foils), which permits an acceleration of the foils when subjected to opposing magnetic fields. The gap provides the foils 104 with space in which to accelerate towards the tab 108 and bond with it upon impacting it. This permits a good bond between the foils 104 and the tab 108.

In an embodiment, in one method of using the device 200, the plurality of foils 104 (that are to be bonded together) and the knurled tab 108 (that is to be bonded to the plurality of foils 104) are mounted upon the anvil 206. The foil holding fixture 208 is then moved into position and presses down upon the plurality of foils. The arms of the foil holding fixture press down on the foils 104 bringing them into contact with the knurled tab. The pairs of adjacent arms of the foil holding fixture are then moved towards each other in order to crimp the foils. The coil holder is then moved into position such that each coil of the plurality of coils lies directly above a crimped set of foils. A first set of coils are energized using an electrical current. The opposing magnetic fields cause the foils to be accelerated towards each other and impact one another to bond together. In an embodiment, the foils are accelerated towards the knurled tab to bond with the tab. A second set and/or a third set of coils may then be energized to facilitate improved bonding in the bonded regions and also to facilitate foil bonding in regions where bonding has not previously occurred. Since the second and/or third set of coils are located in a different position from the first set of coils, the foils are subjected to a different opposing magnetic field, which promotes bonding of the foils in regions where bonding may not have previously occurred.

In other words, the first set of coils produces bonding of the foils in a first region, while the second set of coils produces bonding in a second regions which may be different from the first region. In this manner, by using different sets of coils or by using a different amount of electrical energy in a single set of coils, different regions of the plurality of foils may be bonded together. The different sets of coils may be energized simultaneously or sequentially as desired.

The process of bonding foils together or of bonding foils to the tab using magnetic welding is advantageous because dissimilar metals may be bonded together. Contaminants do not disrupt or weaken the bond.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A device for magnetic welding of battery boils comprising:
   a coil holder; where the coil holder comprises one or more electrical coils that are operative to be activated by an electrical current;
   a foil holding fixture; wherein the foil holding fixture comprises a plurality of arms; wherein each pair of adjacent arms is operative to move towards one another to crimp a plurality of battery foils; and
   an anvil; wherein the anvil is operative to support a battery tab and the battery foils.

2. The device of claim 1, wherein each pair of adjacent arms move symmetrically about a vertical axis through a coil.

3. The device of claim 1, wherein each pair of adjacent arms are located symmetrically about the one or more electrical coils.

4. The device of claim 1, wherein the coil holder further comprises a plurality of sets of electrical coils; where each set of electrical coils is located at a different height from a surface of the coil holder.

5. The device of claim 1, where each electrical coil of the one or more electrical coils is activated by an electrical current of a different strength.

6. The device of claim 4, where each set of electrical coils is activated by an electrical current of a different strength.

7. The device of claim 1, where the coil holder comprises an electrically insulating material.

8. The device of claim 7, wherein the electrically insulating material comprises an organic polymer, a ceramic or a combination thereof.

9. The device of claim 1, wherein the plurality of arms are transported along guide rails; where the arms have grooves at a rear end that mesh with the guide rails.

10. The device of claim 1, wherein the coil holder is in communication with a source of electrical energy.

11. The device of claim 1, wherein the plurality of arms comprise an electrically insulating material.

12. The device of claim 4, wherein each set of electrical coils activates bonding in a different region of the plurality of battery foils.

13. The device of claim 12, wherein different sets of electrical coils may be activated simultaneously.

14. The device of claim 12, wherein different sets of electrical coils may be activated sequentially.

* * * * *